US 10,721,133 B2

(12) United States Patent
Nagarajan et al.

(10) Patent No.: US 10,721,133 B2
(45) Date of Patent: Jul. 21, 2020

(54) UNDERLAY NETWORK FORMATION

(71) Applicant: Cisco Technology, Inc., San Jose, CA (US)

(72) Inventors: Praveen Nagarajan, Milpitas, CA (US); Shashank Vinchurkar, San Jose, CA (US); Rajesh Arora, Pleasanton, CA (US); Anand Pulicat Gopalakrishnan, Fremont, CA (US); Leena Shrirang Chunekar, San Jose, CA (US); Nayan Seth, San Jose, CA (US); Sanjay Hooda, Pleasanton, CA (US); Amey Magar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 10 days.

(21) Appl. No.: 16/058,541

(22) Filed: Aug. 8, 2018

(65) Prior Publication Data

US 2020/0052971 A1  Feb. 13, 2020

(51) Int. Cl.
 H04L 12/24 (2006.01)
(52) U.S. Cl.
 CPC .......... *H04L 41/12* (2013.01); *H04L 41/0806* (2013.01)
(58) Field of Classification Search
 None
 See application file for complete search history.

(56) References Cited

U.S. PATENT DOCUMENTS

| | | | |
|---|---|---|---|
| 6,538,416 B1 * | 3/2003 | Hahne | H04L 45/26 209/238 |
| 7,508,801 B1 * | 3/2009 | Calhoun | H04L 63/0823 370/338 |
| 7,606,229 B1 * | 10/2009 | Foschiano | H04L 12/4641 370/392 |
| 7,756,027 B1 * | 7/2010 | Reddy | H04L 41/0806 370/230 |
| 8,386,593 B1 * | 2/2013 | Gao | H04L 41/085 709/223 |
| 10,425,281 B2 * | 9/2019 | Grevers, Jr. | H04L 41/0856 |

(Continued)

FOREIGN PATENT DOCUMENTS

CN       101621414 A       1/2010

OTHER PUBLICATIONS

Waddington, et al., "Topology Discovery for Public IPv6 Networks", ACM SIGCOMM Computer Communication Review, vol. 33, Issue 3, Jul. 2003, pp. 59-68, ACM.

*Primary Examiner* — Andrew C Oh
(74) *Attorney, Agent, or Firm* — Behmke Innovation Group LLC; Kenneth J. Heywood; Jonathon P. Western

(57) ABSTRACT

In one embodiment, a supervisory device designates a particular networking device among a set of networking devices as a seed device and one or more interfaces of the seed device as discovery interfaces. The supervisory device coordinates, starting from the one or more discovery interfaces of the seed device, discovery of a Layer 2 topology of the set of networking devices, by designating one or more interfaces of a discovered networking device as discovery interfaces. The supervisory device converts, starting from at least one of the network devices farthest from the seed device in the Layer 2 topology and ending with the seed device, links of the Layer 2 topology into Layer 3 links, to form an underlay network.

20 Claims, 18 Drawing Sheets

(56) References Cited

U.S. PATENT DOCUMENTS

| | | | |
|---|---|---|---|
| 2003/0041151 A1* | 2/2003 | Senapati | H04L 12/2856 709/229 |
| 2006/0020525 A1* | 1/2006 | Borelli | G06Q 30/04 705/34 |
| 2007/0198671 A1* | 8/2007 | Motoyama | G08C 17/02 709/222 |
| 2008/0031257 A1* | 2/2008 | He | H04L 43/50 370/395.31 |
| 2008/0052384 A1* | 2/2008 | Marl | H04L 12/2807 709/223 |
| 2009/0129382 A1 | 5/2009 | Elias et al. | |
| 2011/0283017 A1* | 11/2011 | Alkhatib | H04L 45/566 709/244 |
| 2013/0191688 A1* | 7/2013 | Agarwal | H04L 41/0873 714/32 |
| 2013/0346576 A1* | 12/2013 | Huang | H04L 45/745 709/223 |
| 2014/0229944 A1* | 8/2014 | Wang | G06F 9/5088 718/1 |
| 2014/0233387 A1* | 8/2014 | Zheng | H04L 47/125 370/235 |
| 2015/0074260 A1 | 3/2015 | Anand B.S. et al. | |
| 2015/0092592 A1* | 4/2015 | Kuc | H04L 45/12 370/254 |
| 2016/0050116 A1* | 2/2016 | Sheshadri | H04L 41/0843 709/221 |
| 2016/0132397 A1 | 5/2016 | Hui et al. | |
| 2017/0289002 A1 | 10/2017 | Ganguli et al. | |
| 2018/0302289 A1* | 10/2018 | Shen | H04L 41/12 |
| 2018/0316594 A1* | 11/2018 | Wu | H04L 41/12 |
| 2019/0149416 A1* | 5/2019 | Grevers, Jr. | H04L 41/0873 370/254 |
| 2019/0306024 A1* | 10/2019 | Petria | H04W 4/50 |

* cited by examiner

UNDERLAY NETWORK FORMATION

TECHNICAL FIELD

The present disclosure relates generally to computer networks, and, more particularly, to the formation of an underlay network.

BACKGROUND

Virtual networking has attracted significant attention, in recent years. In such implementations, a virtual overlay network is created on top of a network of physical networking devices, also referred to as the underlay network. Formation of a virtual overlay network has a number of advantages over traditional networking: 1.) network addresses can overlap between multiple tenants of the virtual network, 2.) ease of deploying new services as part of the virtual network (e.g., using service function chaining, etc.), and 3.) support for virtual machine (VM) mobility, which can be important in cloud computing environments, among other benefits.

While overlay networks afford quite a bit of flexibility in terms of making configuration changes, the same does not hold true for the physical underlay network. Notably, the creation of a physical underlay network requires calculating configurations, maintaining Internet Protocol (IP) addresses, and booting up each device, all of which can become very complex as the size of the network increases. In addition, once a physical underlay network has been established, adding new physical networking devices to the underlay network can be disruptive to existing traffic in the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
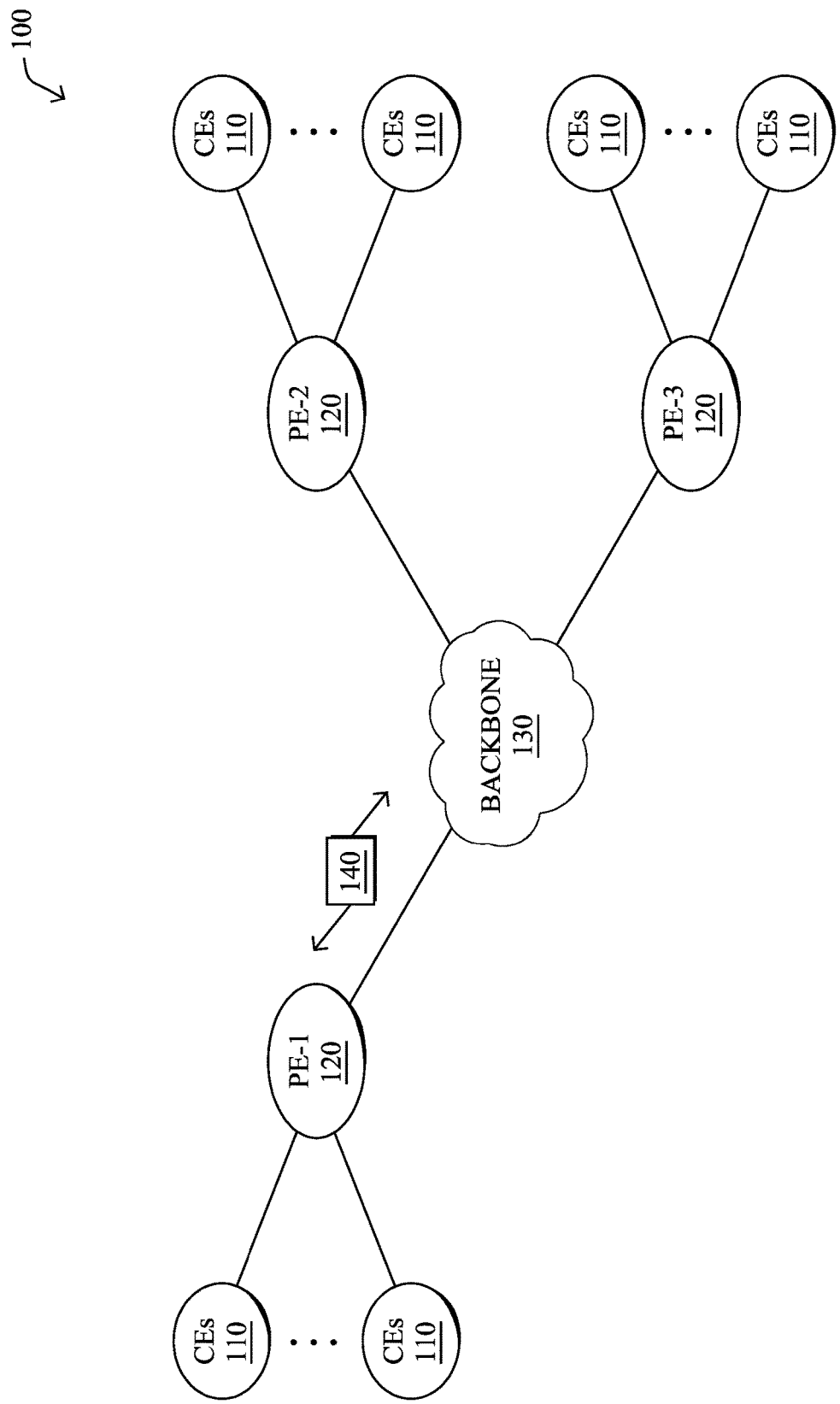
FIGS. 1A-1B illustrate an example communication network.

According to one or more embodiments of the disclosure, a supervisory device designates a particular networking device among a set of networking devices as a seed device and one or more interfaces of the seed device as discovery interfaces. The supervisory device coordinates, starting from the one or more discovery interfaces of the seed device, discovery of a Layer 2 topology of the set of networking devices, by designating one or more interfaces of a discovered networking device as discovery interfaces. The supervisory device converts, starting from at least one of the network devices farthest from the seed device in the Layer 2 topology and ending with the seed device, links of the Layer 2 topology into Layer 3 links, to form an underlay network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
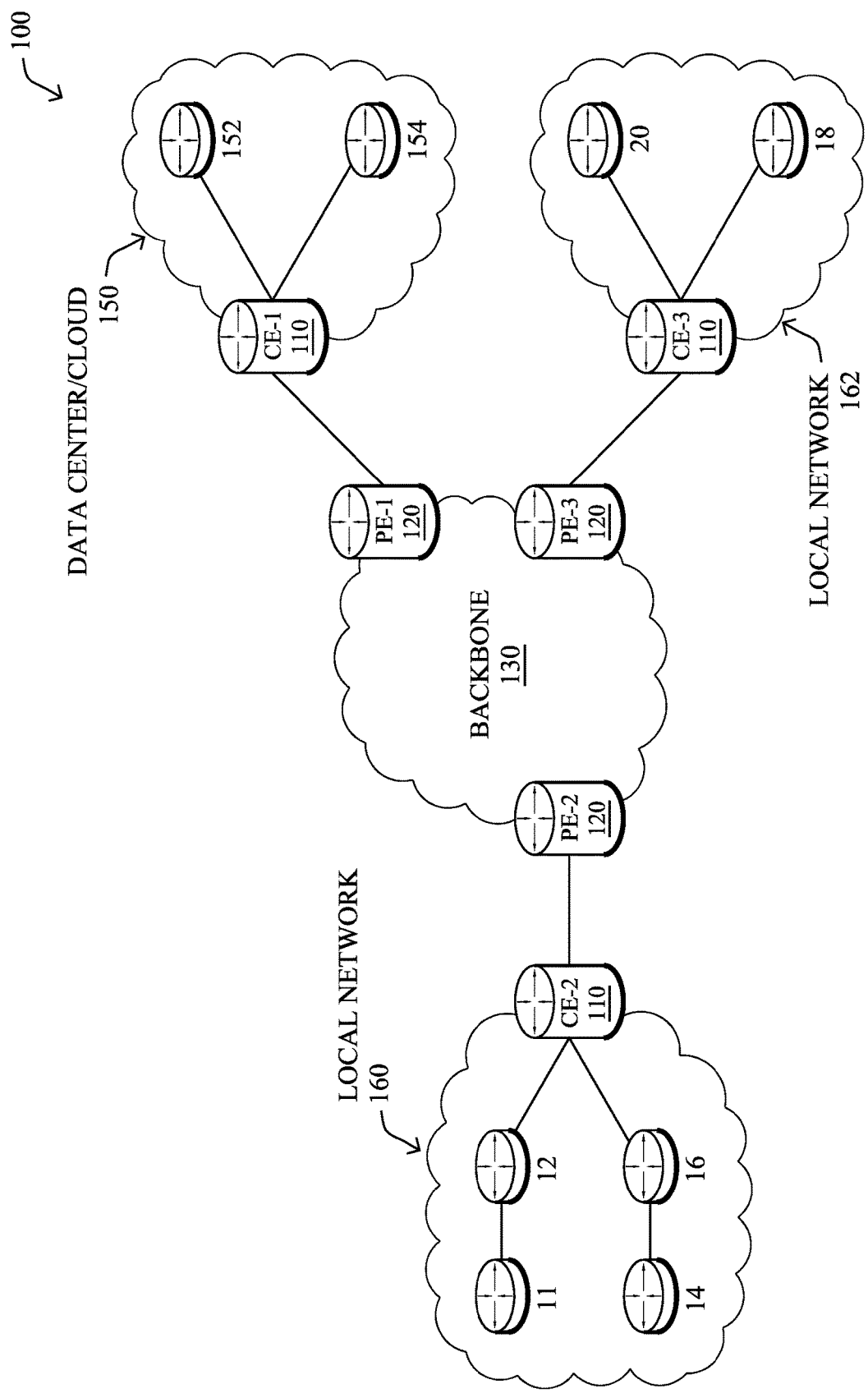

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 11-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 11-16 in the local mesh, in some embodiments.

Figure 2:
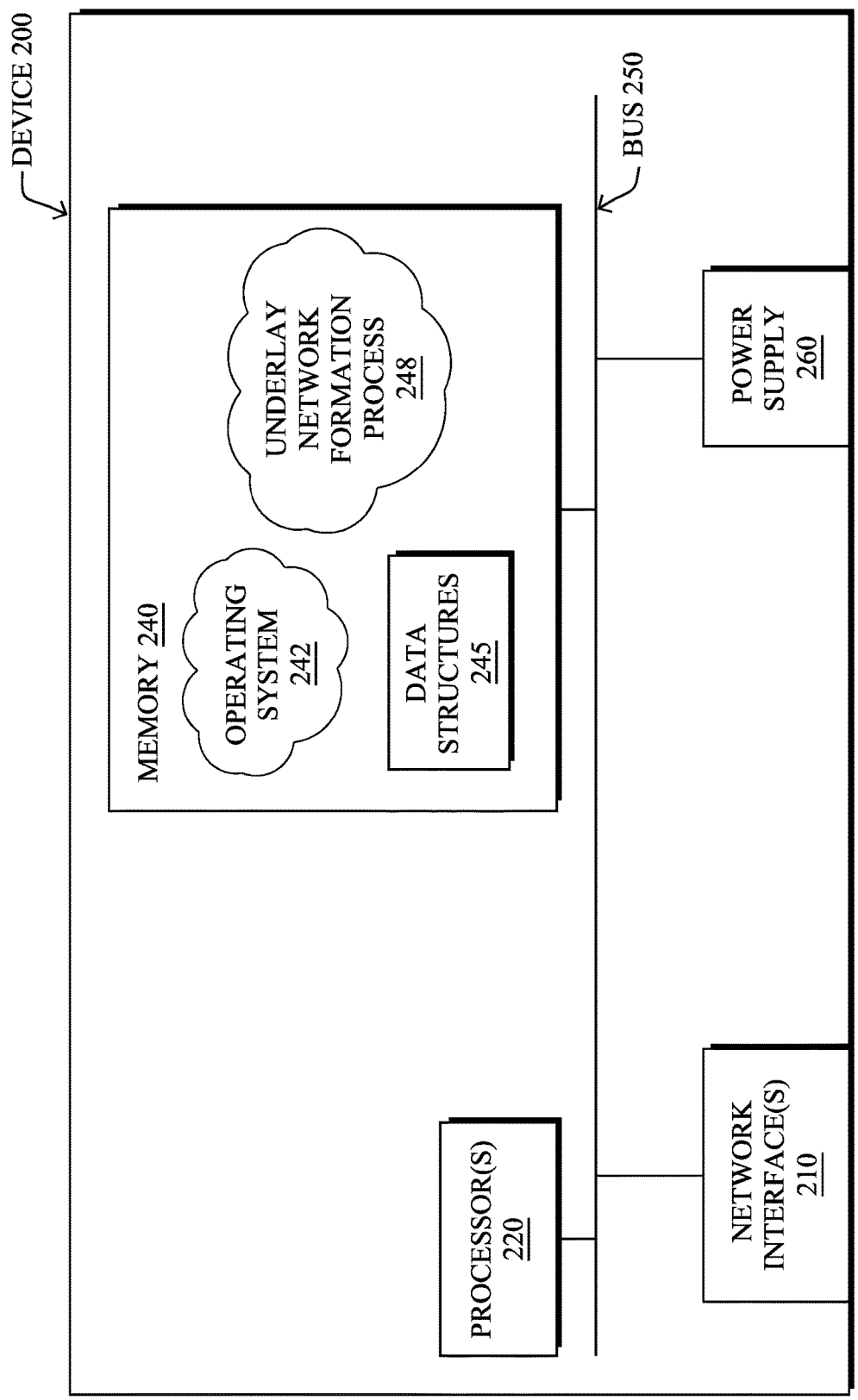
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 11-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an underlay network formation process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, underlay network formation and configuration remains significantly more difficult than for the corresponding overlay network. Notably, IP address pools for the underlay network are typically maintained manually. In addition, to ensure there are proper routes configured between the networking devices and there are no overlooked topology loops, IP address allocations need to be documented and persevered. Careful consideration also has to be put into the design of the underlay network, as changes to a deployed underlay network can be highly disruptive. Additionally, this doesn't take care of the dynamic nature of the network.

Underlay Network Formation

The techniques herein introduce a supervisory network service that can bring up an underlay network in a controlled manner, to allow the network connectivity between the networking devices of the underlay network to start functioning. In some aspects, the supervisory service may handle the IP addressing, configuration, and dynamic changes in the physical network.

Specifically, according to one or more embodiments of the disclosure as described in detail below, a supervisory device designates a particular networking device among a set of networking devices as a seed device and one or more interfaces of the seed device as discovery interfaces. The supervisory device coordinates, starting from the one or more discovery interfaces of the seed device, discovery of a Layer 2 topology of the set of networking devices, by designating one or more interfaces of a discovered networking device as discovery interfaces. The supervisory device converts, starting from at least one of the network devices farthest from the seed device in the Layer 2 topology and ending with the seed device, links of the Layer 2 topology into Layer 3 links, to form an underlay network.

Illustratively, the techniques described herein may be performed by hardware, software, and/or firmware, such as in accordance with the underlay network formation process 248, which may include computer executable instructions executed by the processor 220 (or independent processor of interfaces 210) to perform functions relating to the techniques described herein.

Operationally, the techniques herein introduce an underlay formation process that requires only the physical interface connections to be made between the physical networking devices and for the devices to be powered, in order to establish the underlay network. Generating the requisite configuration files, allocating IP addresses, and configuring the networking devices may be handled by a supervisory service that oversees the devices. The functionality of the service may be divided into two key steps:

1.) using a seed device to discover and configure the Layer 2 network topology; and 2.) using a breadth-first traversal of the Layer 2 topology to convert the Layer 2 networking into a Layer 3 routed network.

In some embodiments, discovery of the underlay network may begin with the designation of a "primary seed device" by the supervisory service from among the networking devices and, potentially, a "peer device," as well. The peer device may be used to restrict discovery in large networks. In addition to designation of the primary seed device and/or the peer device, the service may also designate the discovery interfaces on the primary seed device so that the system can start the discovery process. Specification of the seed device(s) and/or discovery interfaces may be made automatically, predefined, or manually-specified by a user of the service.

In addition to the device discovery, to bring up the network infrastructure, the service may also designate the pool of IP addresses for use by the discovered devices. Such a pool should be of sufficient size to accommodate the number of network elements (e.g., Loopback0 and Link configurations). The service may provide the seed device with the designated pool of IP addresses which will be used to configure DHCP addresses on the new devices. Such IP address assignments may be on a temporary basis, in some cases, until the underlay network formation process is complete.

In various embodiments, each of the networking devices may execute an agent that is started on boot up and requests an IP address from the designated pool of addresses. After this, the supervisory service may send a broadcast message (e.g., a ZtdDeviceUnclaimedMessage), to claim a device and queue it for processing. The device-instance may remain in the queue until connectivity to one of the discovery interfaces of the primary seed device is established. At this point, the networking device is removed from the queue by the service and the service generates and sends an appropriate configuration file to the networking device based on the discovered network topology. An IP subnet may also be allocated and reserved for each of the physical links in the discovered topology and stored by the service. Loopback0 addresses and link subnets are continuously reserved, and configuration files are appropriately generated and pushed to each of those devices.

FIGS. 3A-3F illustrates an example of discovering a Layer 2 topology, in accordance with the teachings herein. As shown, assume that there is a set 300 of networking devices (e.g., devices 1-10 shown) from which an underlay network may be formed. Such devices may include, for example, virtual layer switches or other types of networking devices that can be used to form an underlay network. Overseeing and coordinating the discovery of the devices to participate in the underlay network and formation of the network may be a supervisory service executed locally and/or as a cloud-based service.

By way of example of the techniques herein, assume that device 1 shown is designated the seed device by the supervisory service and that device 7 has been designated the peer device. Peer device 7 is used for purposes of limiting the device discovery and its designation can be omitted in some cases. In other embodiments, the device discovery can be limited via a parameter that specifies a maximum number of hops from the primary seed device.

Figure 3A:
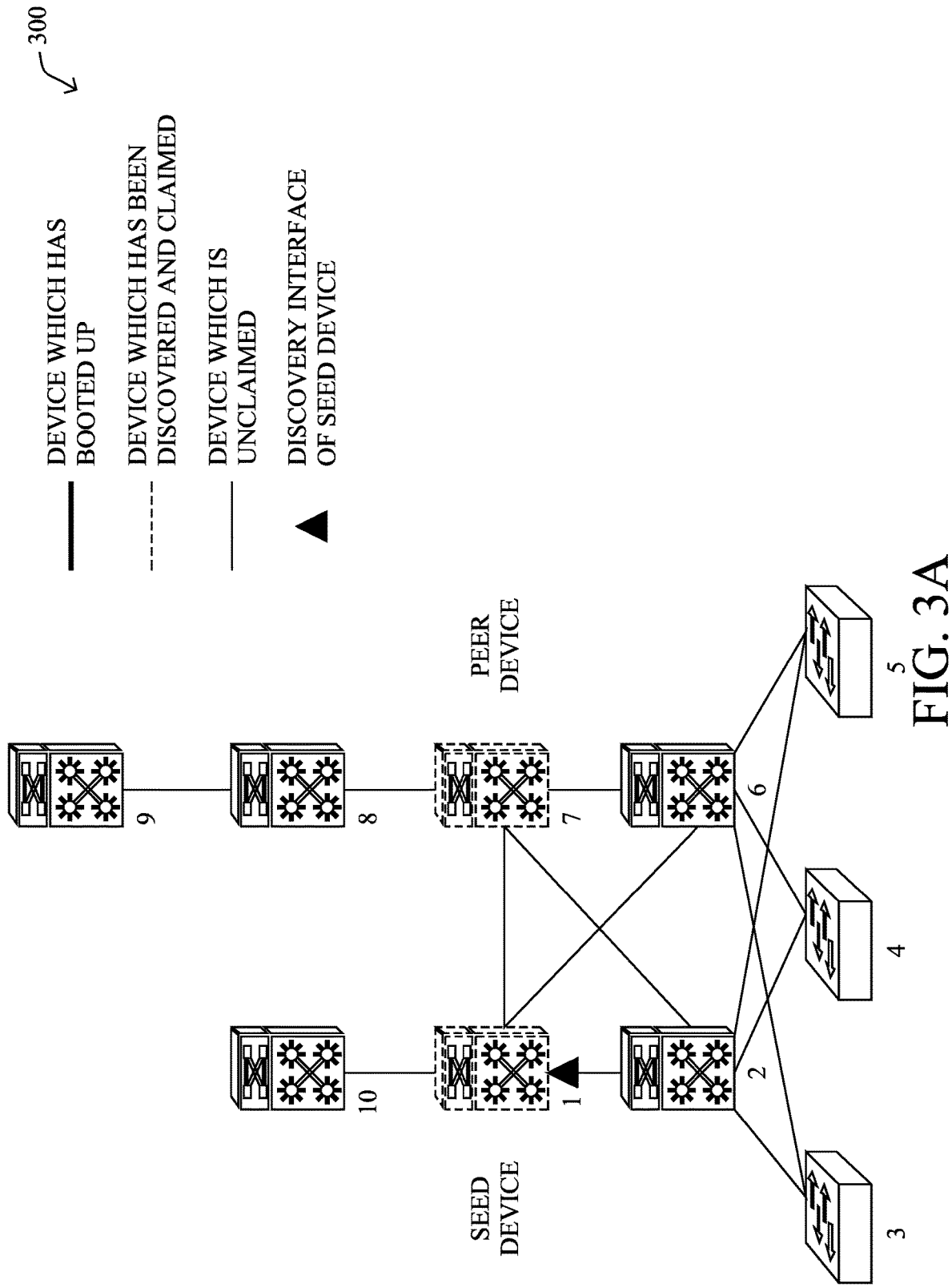
FIGS. 3A-3F illustrates an example of discovering a Layer 2 topology.
Figure 3B:
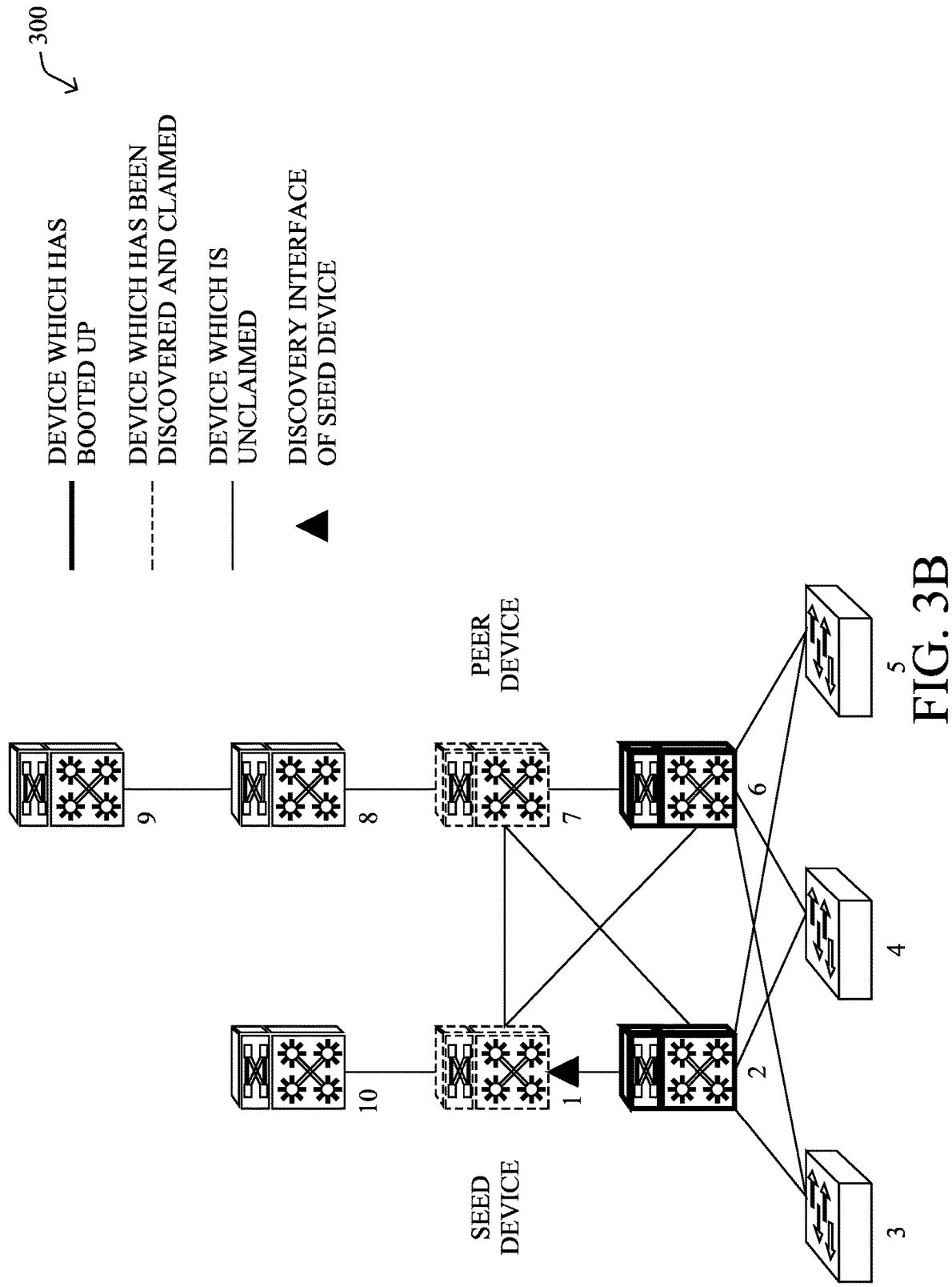

In FIG. 3B, now assume that devices 2 and 6 happen to boot up first. In such a case, they may establish connectivity to the seed device 1 and each reserve a temporary DHCP IP address. Since device 2 has a link to the discovery interface of seed device 1, it will be claimed. However, since device 6 does not have connectivity to a discovery interface of seed device 1, it may be queued in the meantime.

Figure 3C:
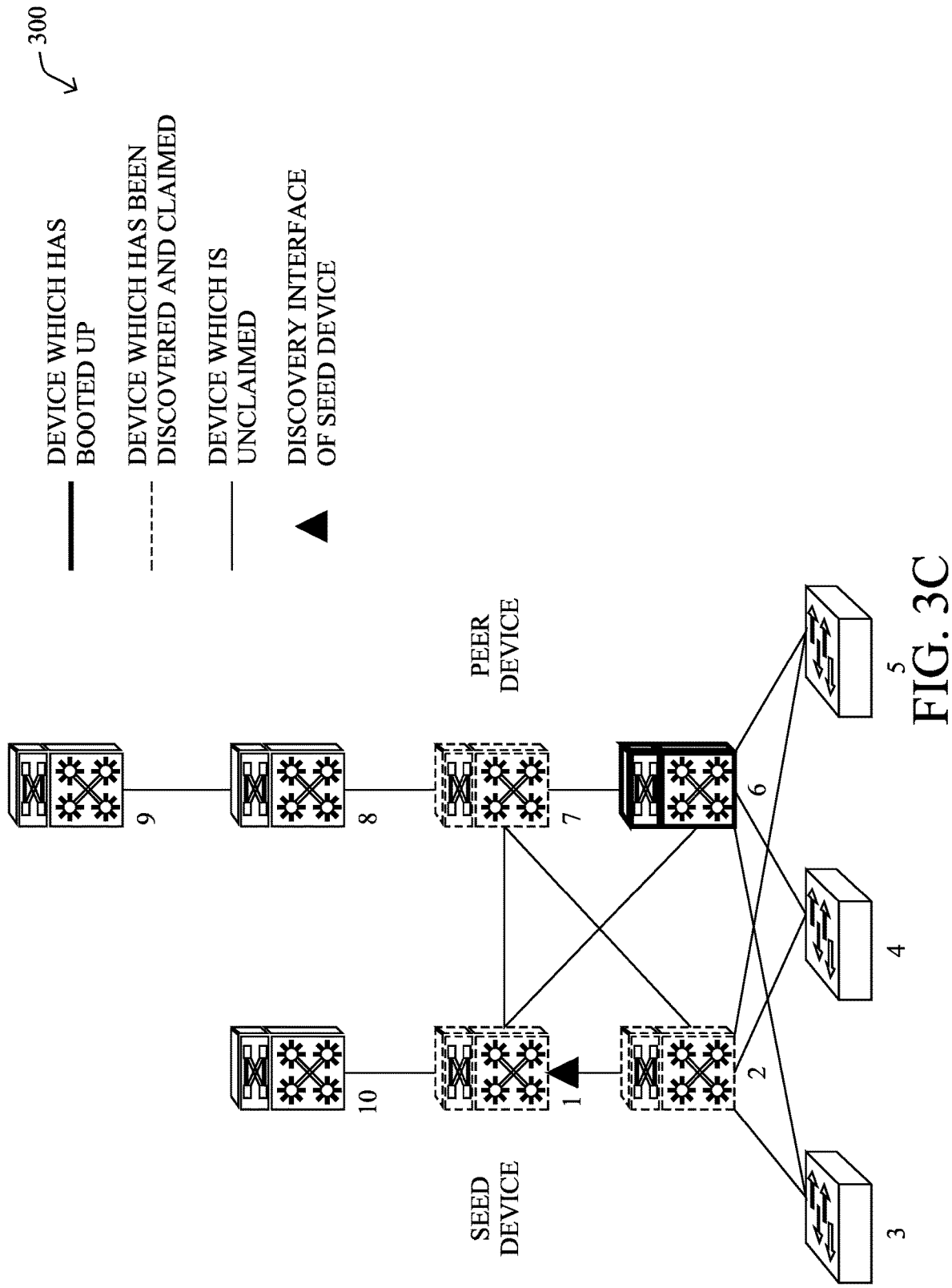

In FIG. 3C, once device 2 has been discovered and claimed, as device 2 is directly connected to a discovery interface of seed device 1, the supervisory service may configure device 2. During such configuration, one or more interfaces of device 2 may be designated by the service as discovery interfaces. In doing so, device 2 effectively becomes an extension of seed device 1 during the discovery phase (e.g., as an intermediate device between other devices and seed device 1 in the discovered topology). By becoming such an intermediate device, the system will honor any devices connected to device 2.

Note that device 7, being designated by the supervisory service as a "peer device," will not become an extension of seed device 1. This is an important aspect of the discovery process, as it bounds the discovery of the network. In addition, this also ensures that the discovery process only handles those devices that are connected through the selected interfaces on the primary seed device or intermediate devices.

Figure 3D:
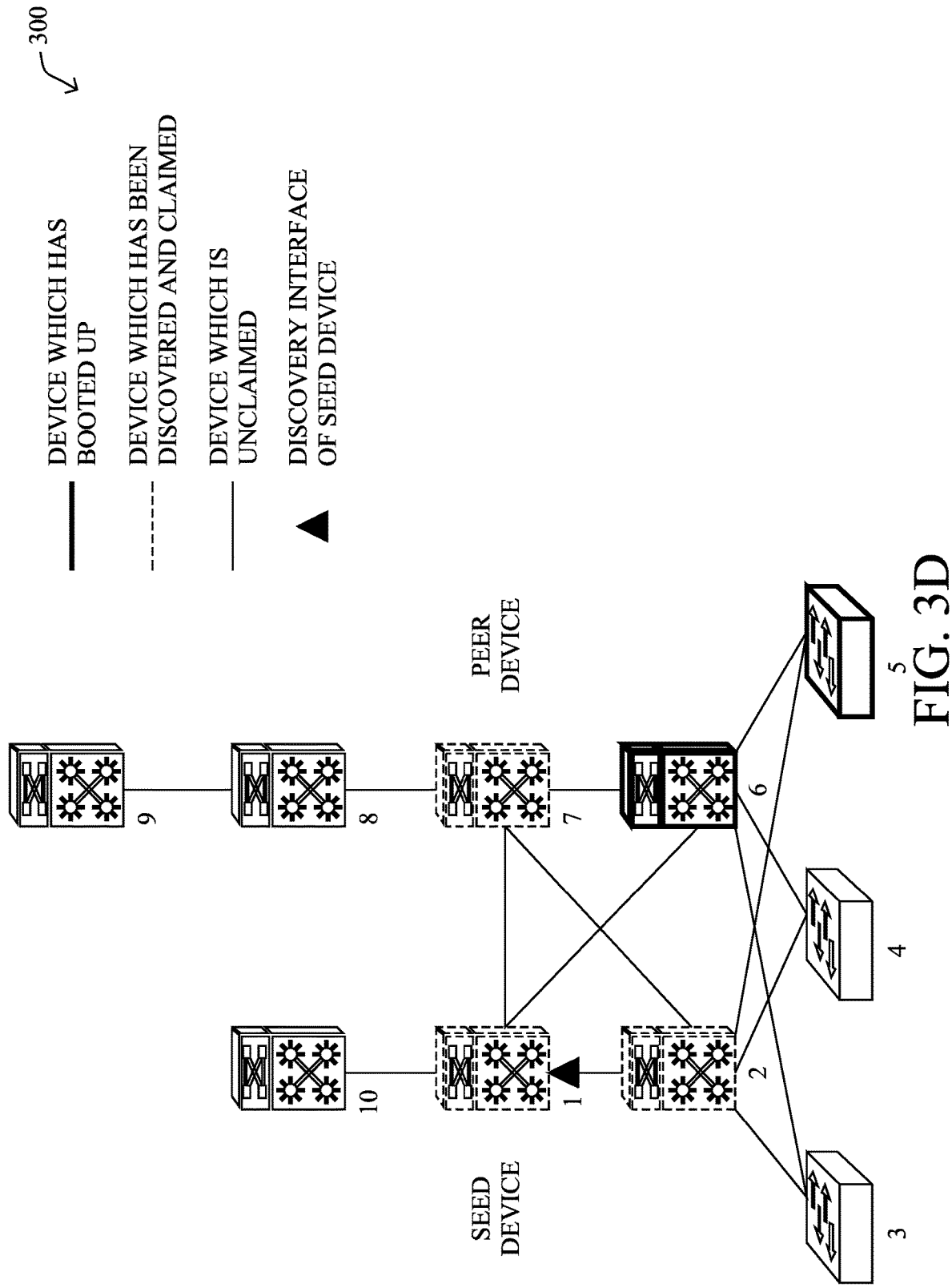

In FIG. 3D, now assume that device 5 has been booted and that device 2 has been claimed. In turn, device 5 may be added to the discovered queue and assigned a DHCP IP address. The supervisory service may assess the queue to see whether any of the devices in the queue can likewise be claimed. Since device 2 is now an intermediate device/extension of seed device 1, device 5 may also be claimed as an extension of the seed device 1 and its interface(s) turned into discovery interfaces via configuration.

Figure 3E:
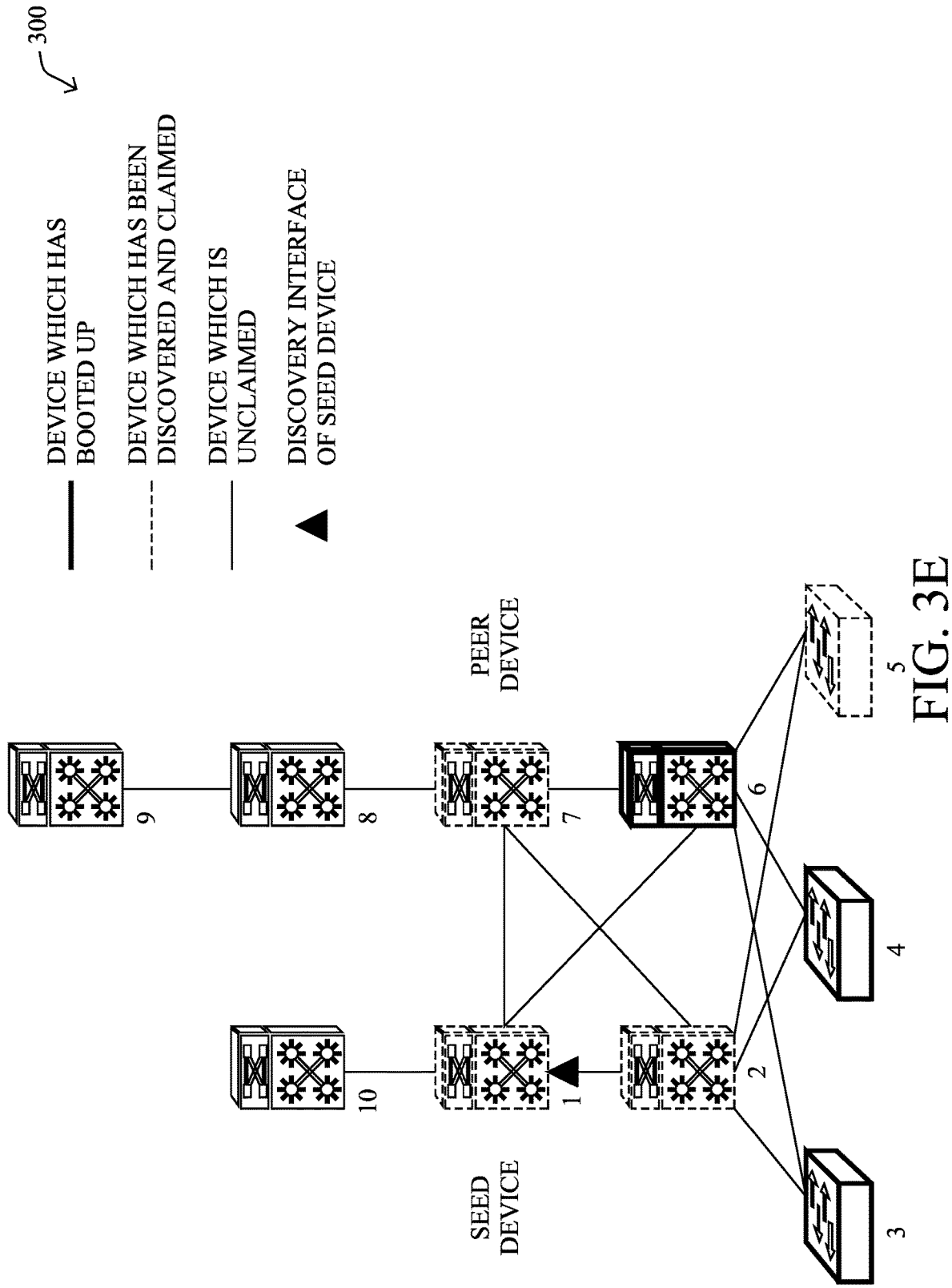

In FIG. 3E, assume that device 5 has been claimed and that devices 3 and 4 next boot. In turn, these devices may each be assigned DHCP IP addresses and added to the queue. Since both of devices 3 and 4 are directly connected to device 2, which is an extension of seed device 1, these devices may also be claimed. Similarly, as device 6, which had been previously discovered but remained unclaimed in the discovered queue, is now directly connected to claimed intermediate device 5, it may also be claimed.

Figure 3F:
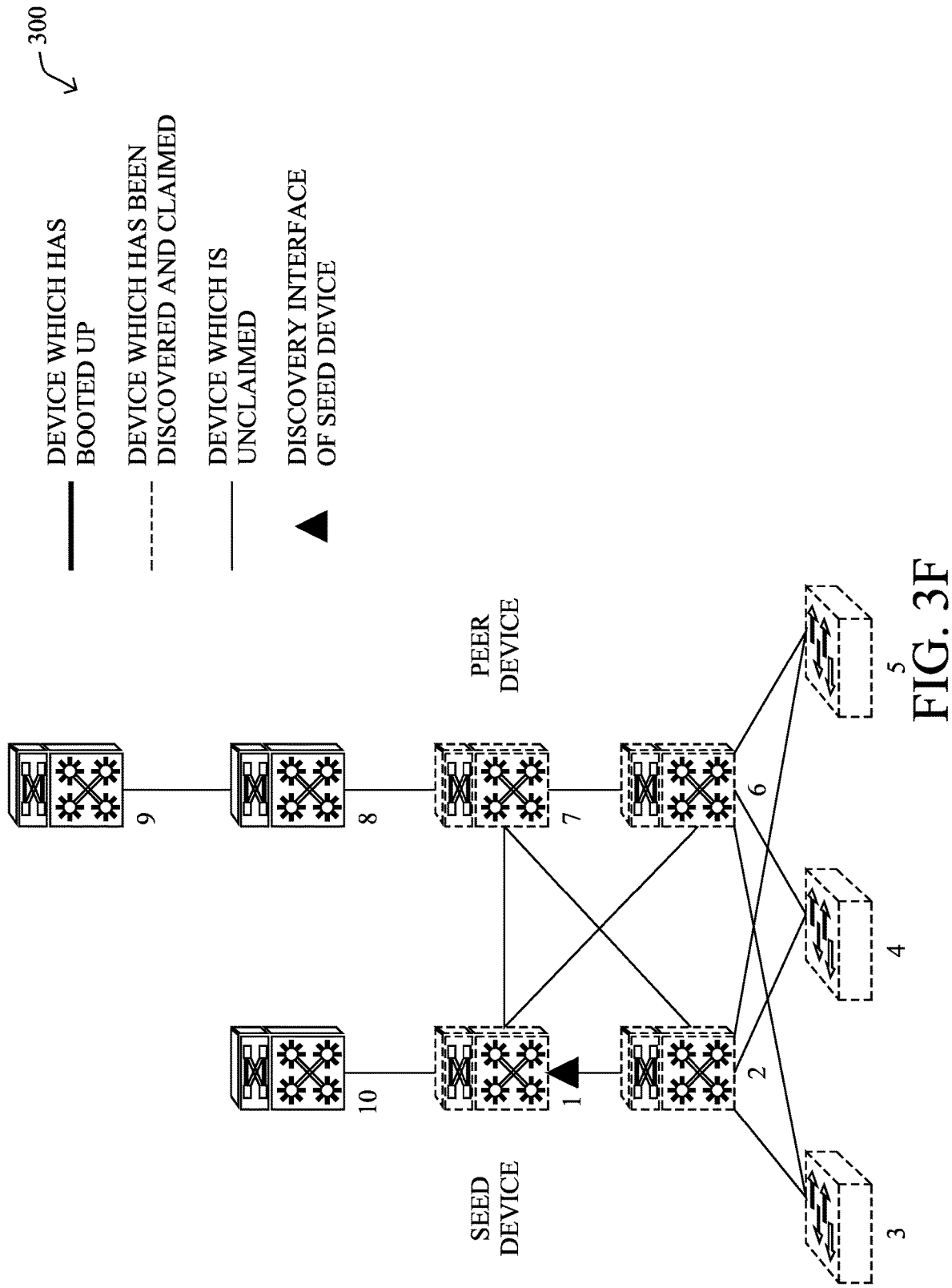

In FIG. 3F, devices 1-7 have now been claimed and the discovered queue of the supervisory service is now empty, thus forming a Layer 2 topology from the set 300 of networking devices. Note that devices 8 and 9 remain unclaimed, as they were never connected to either a discovery interface of seed device 1 or to an intermediate device that acts as an extension of seed device 1. In other words, peer device 7 acts as a boundary for the discovery process, effectively limiting which devices can form the underlay network. Similarly, device 10 is also not discovered, claimed, or configured, since it does not have any connectivity to a discovery interface of seed device 1 or to an intermediate device that acts as an extension of seed device 1.

In various embodiments, at the end of discovery for the new devices, the supervisory service may then convert the Layer 2 interfaces of the devices in the discovered Layer 2 topology into Layer 3 links. However, if a proper ordering to the conversion is not used, the process of changing an interface to Layer 3 can disrupt connectivity to devices which are further down in the topology. In some embodiments, the techniques herein propose first beginning by changing over the interfaces that are farthest away from the seed device in the discovered topology and would not cause any disruptions to existing traffic. To do so, the supervisory service may maintain a graph of the Layer 2 network topology and traverse the graph, as detailed below. This traversal of the graph ensures connectivity is maintained with all of the new devices during the Layer 3 link conversion process. Finally, the temporary DHCP pool is released and network traffic persists via the Layer 3. The service maintains responsibility for the IP addresses reserved in the discovery process and ensures proper release of relevant IP addresses, if devices are moved or removed from the topology.

More specifically, to traverse the topology graph, the supervisory service may maintain the following data structures, when converting the Layer 2 links into Layer 3 links, in some embodiments:

1.) A Queue: The queue retains a list of visited neighbors.
2.) A Stack: The stack maintains the list of vertices which would disrupt the connectivity if their links are configured to layer 3 without configuring other device links.
3.) An Array: The array indicates the visit status of the devices.

As would be appreciated, other data structures can also be used, in further implementations.

Figure 4:
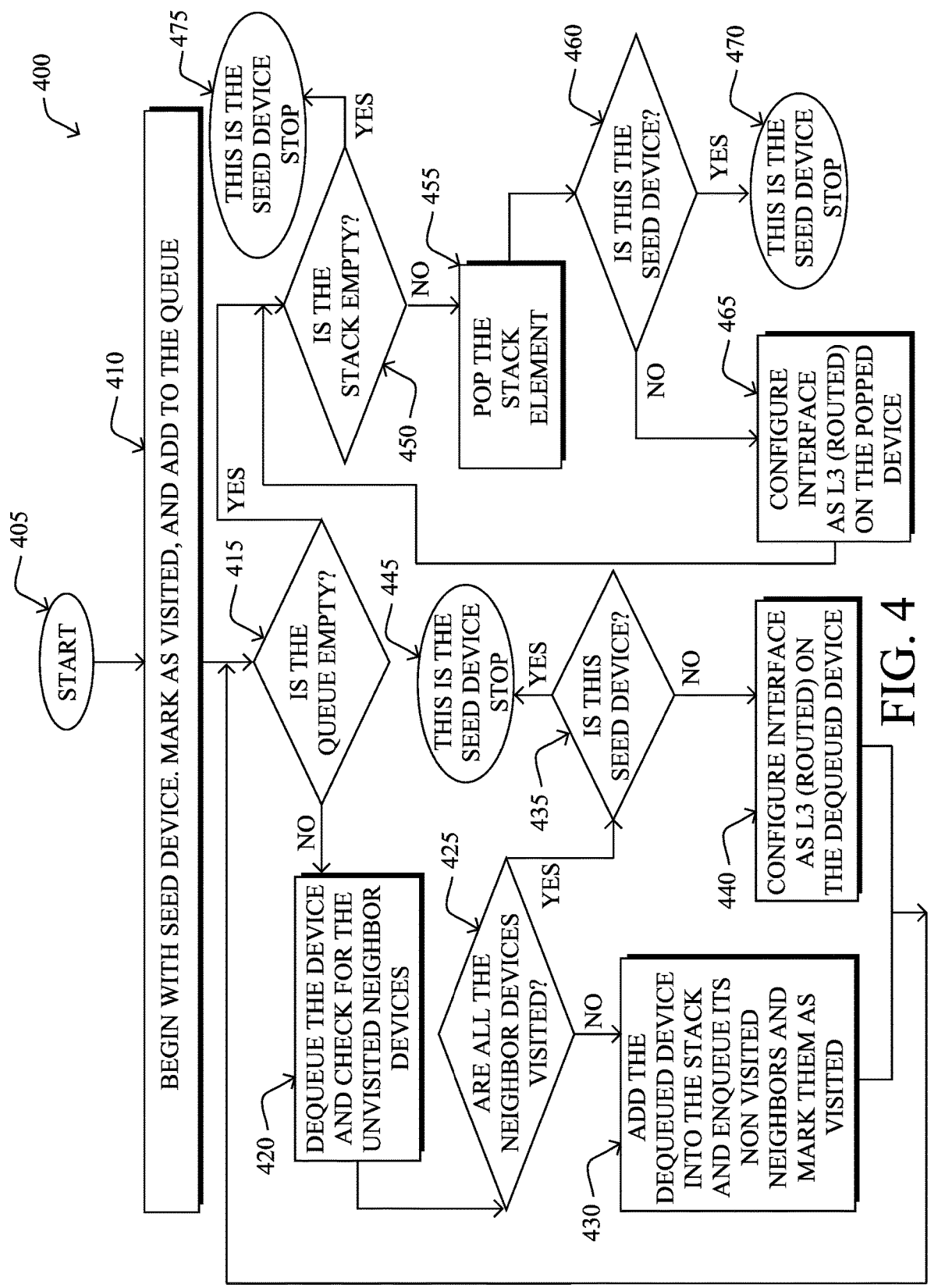
FIG. 4 illustrates an example flow diagram for converting Layer 2 links into Layer 3 links.

FIG. 4 illustrates an example flow diagram 400 for converting Layer 2 links into Layer 3 links, according to the teachings herein. As shown, flow diagram 400 may start at step 405 and continues on to step 410 where the supervisory service may begin traversing the graph of the Layer 2 topology from the discovery phase with the designated seed device. In turn, the service may mark the seed device as visited and add it to the queue of visited devices.

At decision step 415, the service may determine whether the visited queue is empty. If so, flow diagram 400 proceeds on to decision step 450. If not, however, flow diagram 400 continues on to step 420.

At step 420, if the visited queue is not empty, the service may dequeue the top networking device in the visited queue and check for unvisited neighbors of the device. In turn, at decision step 425, the service may determine whether the dequeued networking device has any unvisited neighbors. If so, flow diagram 400 continues on to step 430. Otherwise, if the dequeued networking device has no unvisited neighbors, flow diagram 400 continues on to step 435.

At step 430, when the dequeued networking device has unvisited neighbors, the supervisory service may add the dequeued device into the stack maintained by the service. In addition, the service may add the unvisited neighbor(s) of the networking device and mark them as visited. Processing in flow diagram 400 then returns back to decision step 415 highlighted above.

At decision step 435, if the dequeued networking device has no unvisited neighbors, the service may then check whether the dequeued device is the designated seed device in the network. If so, flow diagram 400 continues to step 445 and processing stops. However, if the dequeued networking device is not the designated seed device, flow diagram 400 continues on to step 440 and the service converts the interface(s) of the dequeued networking device over to Layer 3 (i.e., routed). Flow diagram 400 then returns to step 415 from step 440.

If the queue is empty, as determined in step 415, flow diagram 400 may continue on to step 450, where the service determines whether its stack is empty. If the stack is also empty, flow diagram continues on to step 475 and processing by the service ends, since the underlay network has now been formed and its constituent networking devices converted over to Layer 3. However, if the stack is not empty, flow diagram 400 continues on to step 455.

At step 455, the service pops the next networking device in the stack. Flow diagram 400 then continues on to decision step 460 where the service determines whether the device from the stack is the designated seed device. If so, flow diagram 400 continues on to step 470 and processing ends, as the network is now formed and complete. However, if the networking device from the stack is not the seed device, flow diagram 400 continues on to step 465 where the service converts the interface(s) of the networking device from the stack over to Layer 3 interface(s). Flow diagram 400 then returns to step 450 and processing by the service continues. As would be appreciated, processing in flow diagram 400 concludes when the designated seed device has been reached and the underlay network and the links of the Layer 2 topology converted into Layer 3 links.

FIGS. 5A-5G illustrate an example of converting Layer 2 links into Layer 3 links, in accordance with the teachings herein. Continuing the example of FIGS. 3A-3F, assume that the supervisory service has already coordinated the discovery of the Layer 2 topology 500 shown from among the networking devices in the network. Now, the service will convert the links in topology 500 from Layer 2 (switched) links into Layer 3 links, according to the methodology shown in flow diagram 400 in FIG. 4.

Figure 5A:
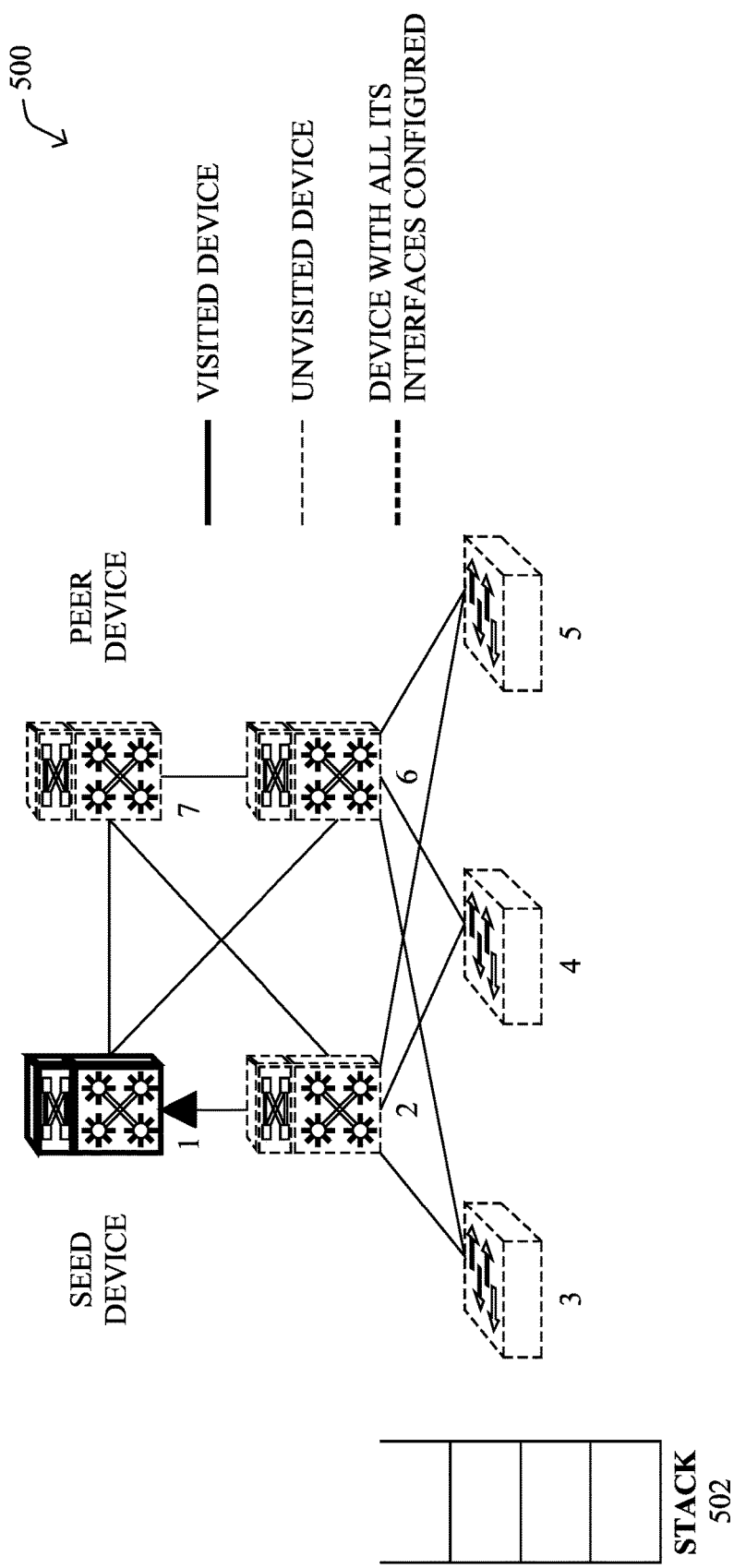
FIGS. 5A-5G illustrate an example of converting Layer 2 links into Layer 3 links.

As shown in FIG. 5A, the service may maintain the following data structures: 1.) stack 502 of networking devices that have unvisited neighbors and/or would disrupt connectivity if their links are converted over to Layer 3, 2.) queue 504 of neighboring devices whose vertices in the topology graph have been "visited" by the service during traversal of the graph, and 3.) an array 506 that flags networking devices whose vertices in the graph have been visited.

To start the process, the service may begin with the designated seed device 1 in topology 500. In turn, the service may mark seed device 1 as visited in array 506 and add seed device 1 to queue 504. It should be noted that, as shown, entries in queue 504 are dequeued from the left.

Figure 5B:
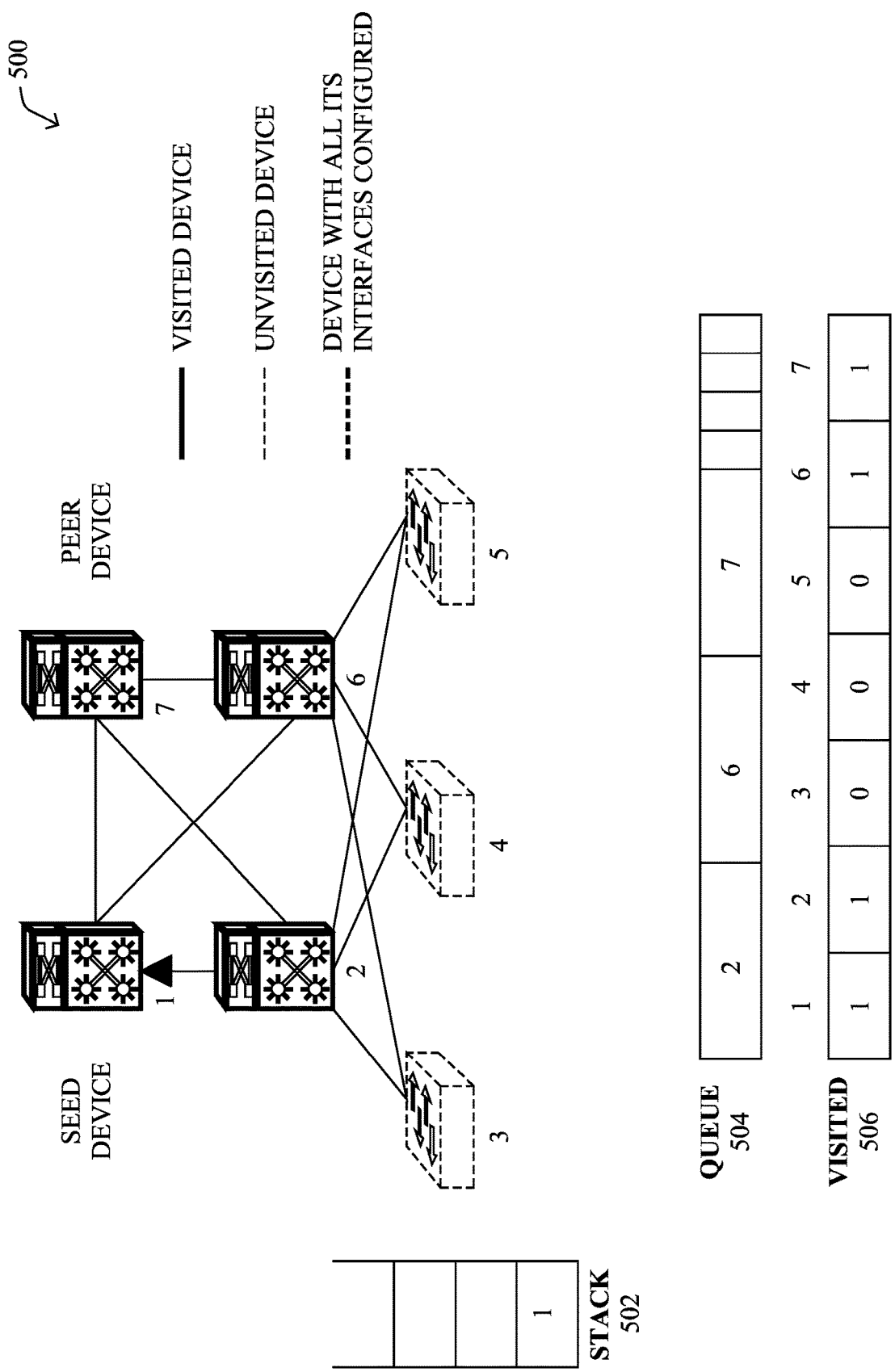

In FIG. 5B, the supervisory service may then dequeue the next entry in queue 504, which happens to be seed device 1. In turn, the service may check for unvisited neighbors of seed device 1, thereby identifying networking device 2, 6, and 7. Since seed device 1 has unvisited neighbors, it is moved from queue 504 into stack 502. In effect, stack 502 serves as a holding ground for those visited devices that have links that could affect connectivity, were they converted into Layer 3 links. Since networking devices 2, 6, and 7 are neighbors of seed device 1, they may be marked as visited in array 506 and each added to queue 504.

Figure 5C:
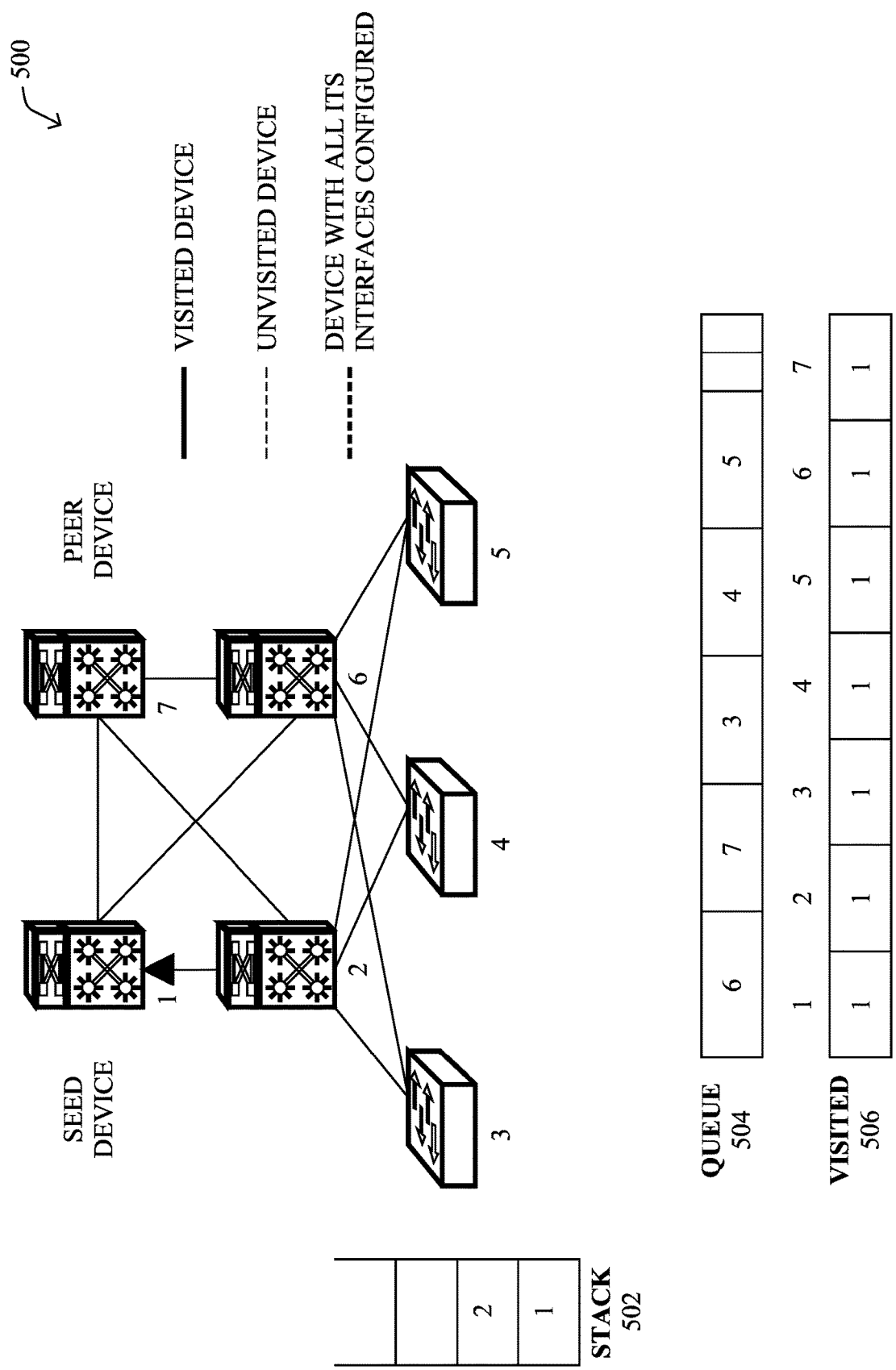

In FIG. 5C, as queue 504 is not empty, the supervisory service may dequeue the next networking device in queue 504, device 2, for processing. Device 2 has neighboring devices 3, 4, 5, and 7. However, of these, only devices 3, 4, and 5 are unvisited, as can be seen from array 506. From this, the service adds devices 3, 4, and 5 to queue 504. Since device 2 had unvisited neighbors, it is added to stack 502, rather than converting its links over to Layer 3.

Figure 5D:
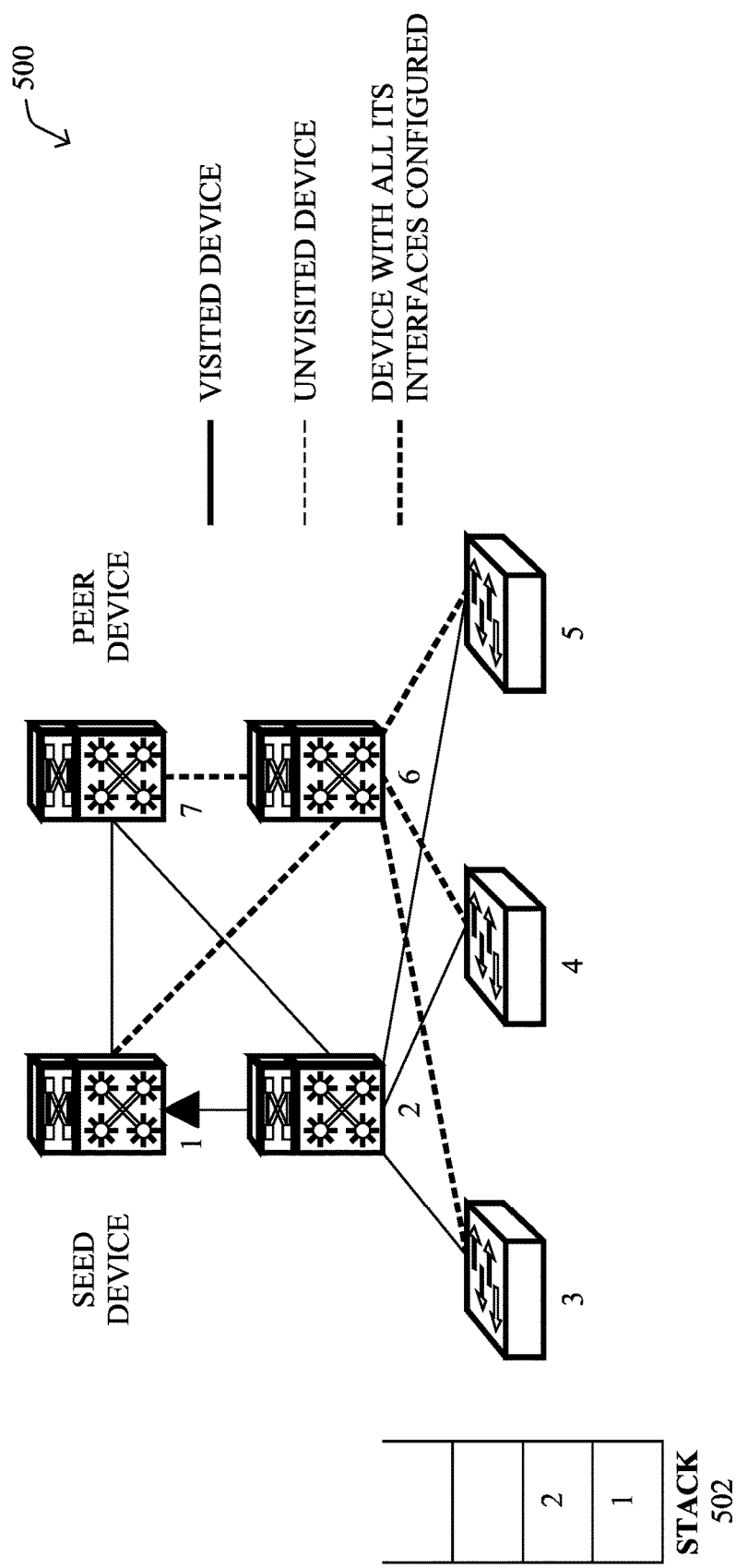

In FIG. 5D, the service now dequeues networking device 6 from queue 504, which has no unvisited neighbors. As such, the service may convert the appropriate interfaces of device 6 from Layer 2 into Layer 3 interfaces/links. Notably, the links between device 6 and devices 1, 3, 4, 5, and 7 can be converted safely into Layer 3 links.

Figure 5E:
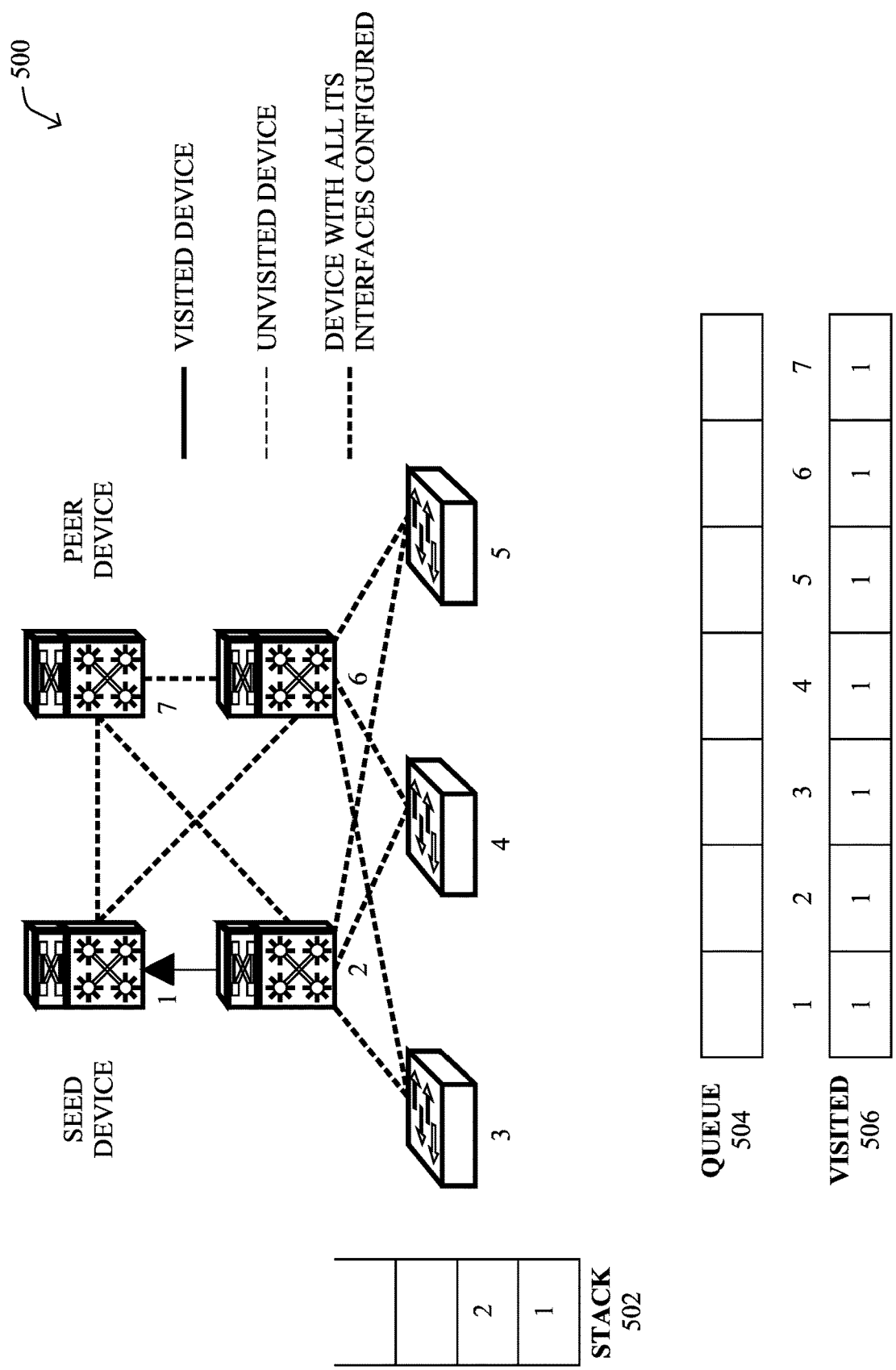

In FIG. 5E, the service may then dequeue device 7 from queue 504. Since device 7 has no unvisited neighbors and will cause no loss of connectivity to other devices in the network, the service may then convert the links of device 7 from Layer 2 to Layer 3 routed. More specifically, the links between device 7 and devices 1 and 2 can be converted into Layer 3 links.

The service may then repeat the above process for each of the devices in queue 504, devices 3, 4, and 5, which each has no unvisited neighbors. Accordingly, the service may convert the remaining links for each of devices 3, 4, and 5 over to Layer 3 links.

Figure 5F:
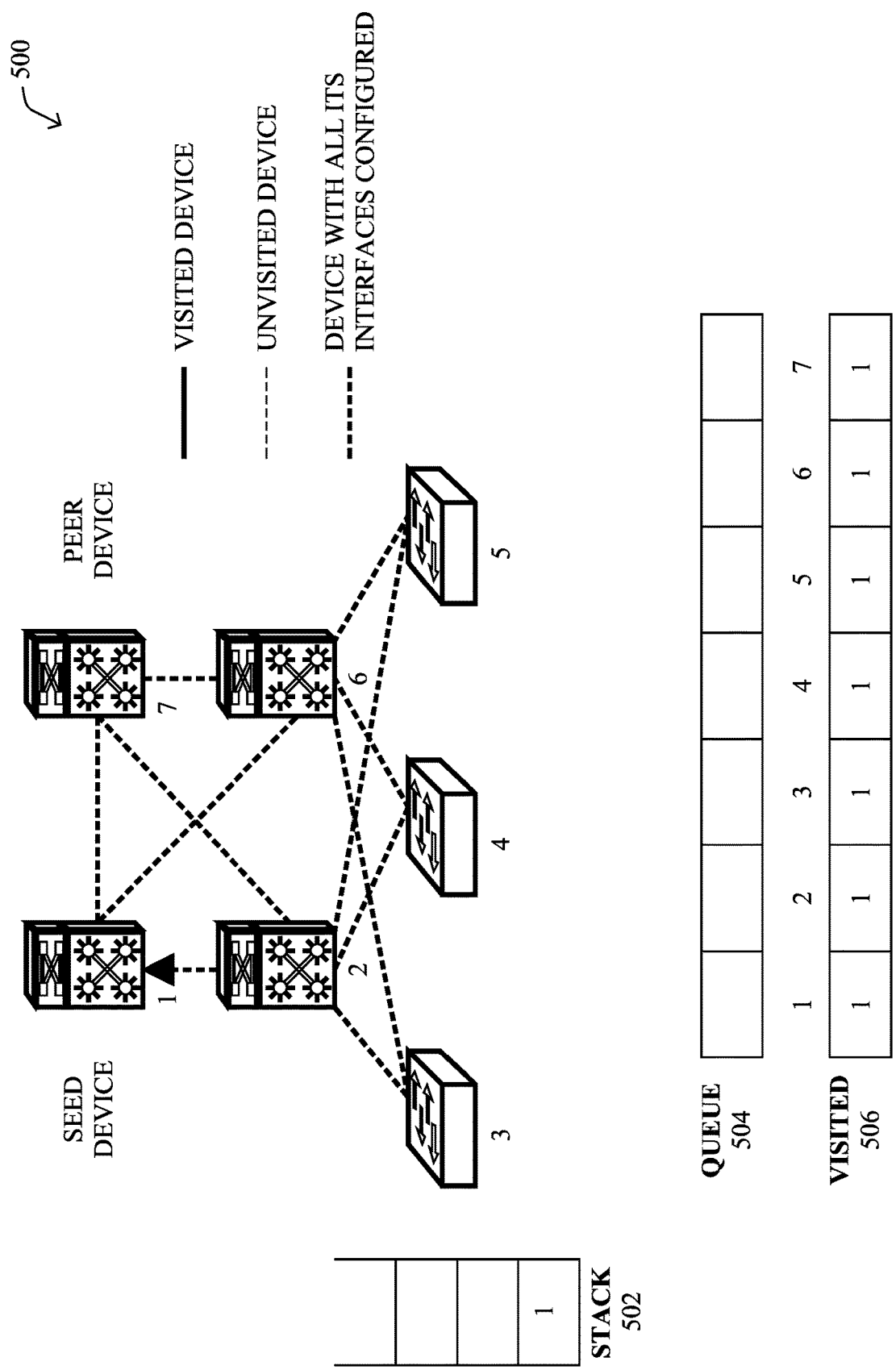
Figure 5G:
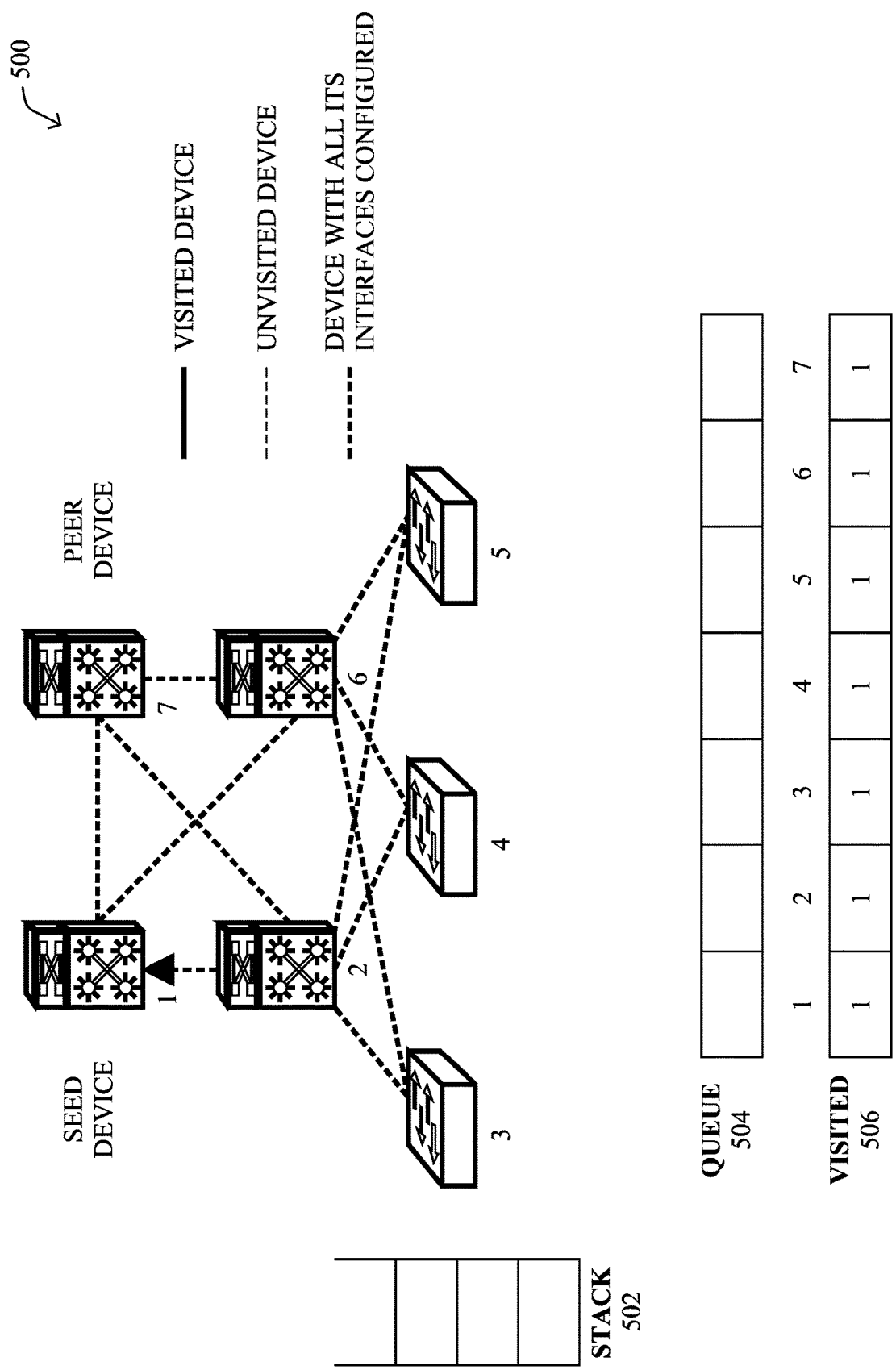

In FIG. 5F, as queue 504 is now empty, the service may move on to processing of stack 502. Here, the service may pop device 2 from stack 502 and convert the appropriate interfaces of device 2 from Layer 2 to Layer 3.

In FIG. 5G, queue 504 is again empty, so the service may pop seed device 1 from stack 502. Since this is the last device in stack 502, the service may check whether device 1 is the designated seed device. Since it is, the service may determine that the conversion process is now complete and end the processing. As a result of the above processing, the devices in topology 500 were processed in the following order: 6→7→3→4→5→2→1.

In summary, the supervisory service overseeing the networking devices first discovered a physical network topology and pushed global configurations to the devices, to create a Layer 2 network. In the next phase of processing, the service then converted the Layer 2 network into a Layer 3 routed network in a manner that does not disrupt any connectivity between the devices.

Figure 6:
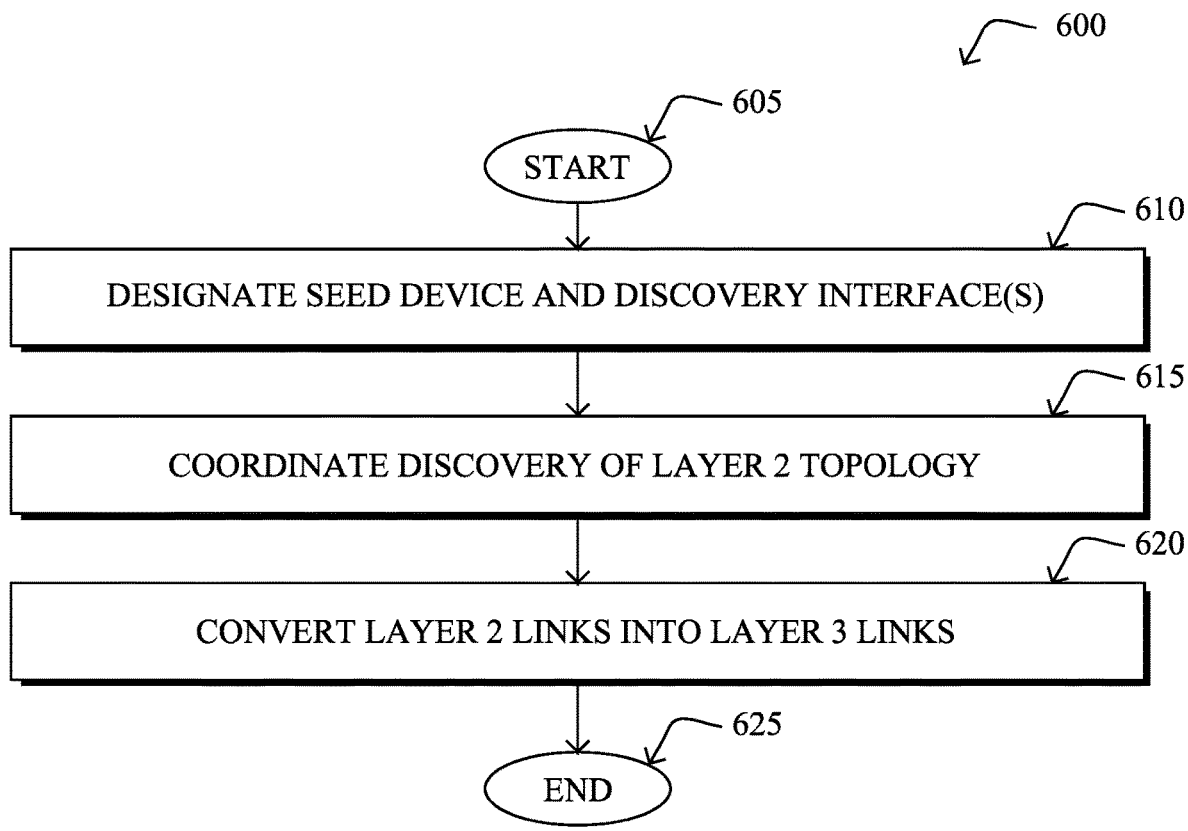
FIG. 6 illustrates an example simplified procedure for forming an underlay network.

FIG. 6 illustrates an example simplified procedure for FIG. 6 illustrates an example simplified procedure 600 for forming an underlay network, in accordance with one or more embodiments described herein. For example, a non-generic, specifically configured supervisory device (e.g., device 200) may perform procedure 600 by executing stored instructions (e.g., process 248) to provide a supervisory service to a set of networking devices. The procedure 600 may start at step 605, and continues to step 610, where, as described in greater detail above, the supervisory device may designate a particular one of the networking devices among a set of networking devices as a seed device and one or more interfaces of the seed device as discovery interfaces. The designation may be predefined or may be selected by a user via a user interface. In some embodiments, the device may also specify a peer device that serves to limit the device discovery in the network, which may be particularly of value in larger network.

At step 615, as detailed above, the supervisory device may coordinate, starting from the one or more discovery interfaces of the seed device, discovery of a Layer 2 topology of the set of networking devices, by designating one or more interfaces of a discovered networking device as discovery interfaces. In other words, the discovery process may begin from the designated discovery interface(s) of the seed device and expand out, with each discovered device effectively becoming an extension of the seed device during discovery. If a peer device is also defined, or if another boundary condition is listed, this may also be taken into account when deciding whether to treat a given device as an extension of the seed. During this phase, the supervisory device may also push configurations to the discovered devices, so as to form a Layer 2 topology among the discovered devices.

At step 620, the supervisory device may convert, starting from at least one of the network devices farthest from the seed device in the Layer 2 topology and ending with the seed device, links of the Layer 2 topology into Layer 3 links, to form an underlay network, as described in greater detail above. Notably, converting the Layer 2 links over to Layer 3 links inward towards the seed device in a strategic manner avoids the conversion causing any connectivity disruptions between the devices. Procedure 600 then ends at step 625.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for forming an underlay network, it is to be understood that various other adaptations and modifications may be made within the spirit and scope of the embodiments herein. For example, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
designating, by a supervisory device, a particular networking device among a set of networking devices as a seed device and one or more interfaces of the seed device as discovery interfaces;
coordinating, by the supervisory device and starting from the one or more discovery interfaces of the seed device, discovery of a Layer 2 topology of the set of networking devices, by designating one or more interfaces of a discovered networking device as discovery interfaces; and
converting, by the supervisory device and starting from at least one of the network devices farthest from the seed device in the Layer 2 topology and ending with the seed device, links of the Layer 2 topology into Layer 3 links, to form an underlay network, wherein converting the links of the Layer 2 topology into Layer 3 links comprises:
traversing a graph of the Layer 2 topology, starting from the seed device, to populate a queue of networking devices visited during the traversal, and
for a networking device at a top of the queue, converting one or more interfaces of the given networking device into Layer 3 links, when the networking device has no unvisited neighbors during the traversal of the graph of the Layer 2 topology and conversion of the one or more interfaces of the networking device into Layer 3 interfaces would not disrupt connectivity among the set of networking devices.

2. The method as in claim 1, wherein coordinating discovery of the Layer 2 topology of the set of networking devices comprises:
broadcasting a message among the set of networking devices that causes an agent on a receiving networking device to send a response to the supervisory device.

3. The method as in claim 1, further comprising:
assigning, by the supervisory device, a pool of Internet Protocol (IP) addresses for use by the set of networking devices, wherein a discovered networking device is assigned a temporary IP address from the pool of temporary IP addresses upon discovery.

4. The method as in claim 3, further comprising:
releasing the pool of temporary IP addresses after the links of the Layer 2 topology have been converted into Layer 3 link.

5. The method as in claim 1, wherein converting the one or more interfaces of the given networking device into Layer 3 links comprises:
moving the networking device at the top of the queue from the queue to a stack, to delay conversion of the one or more interfaces of the networking device into Layer 3 links, when the networking device has at least one unvisited neighbors during the traversal of the graph of the Layer 2 topology or conversion of the one or more interfaces of the networking device into Layer 3 interfaces would disrupt connectivity among the set of networking devices.

6. The method as in claim 1, wherein designating one or more interfaces of a discovered networking device as discovery interfaces comprises:
sending a configuration file to the discovered networking device.

7. The method as in claim 1, wherein the supervisory device is part of a cloud-based service.

8. The method as in claim 1, further comprising:
designating, by the supervisory device, one of the networking devices as a peer device of the seed device, wherein the peer device acts as a boundary for the discovery of the Layer 2 topology.

9. An apparatus comprising:
one or more network interfaces to communicate with a network;
a processor coupled to the network interfaces and configured to execute one or more processes; and
a memory configured to store a process executable by the processor, the process when executed configured to:
designate a particular networking device among a set of networking devices as a seed device and one or more interfaces of the seed device as discovery interfaces;
coordinate, starting from the one or more discovery interfaces of the seed device, discovery of a Layer 2 topology of the set of networking devices, by designating one or more interfaces of a discovered networking device as discovery interfaces; and convert, starting from at least one of the network devices farthest from the seed device in the Layer 2 topology and ending with the seed device, links of the Layer 2 topology into Layer 3 links, to form an underlay network, wherein the apparatus converts the links of the Layer 2 topology into Layer 3 links by:

traversing a graph of the Layer 2 topology, starting from the seed device, to populate a queue of networking devices visited during the traversal, and for a networking device at a top of the queue, converting one or more interfaces of the given networking device into Layer 3 links, when the networking device has no unvisited neighbors during the traversal of the graph of the Layer 2 topology and conversion of the one or more interfaces of the networking device into Layer 3 interfaces would not disrupt connectivity among the set of networking devices.

10. The apparatus as in claim 9, wherein the apparatus coordinates discovery of the Layer 2 topology of the set of networking devices by:

broadcasting a message among the set of networking devices that causes an agent on a receiving networking device to send a response to the apparatus.

11. The apparatus as in claim 9, wherein the process when executed is further configured to:

assign a pool of Internet Protocol (IP) addresses for use by the set of networking devices, wherein a discovered networking device is assigned a temporary IP address from the pool of temporary IP addresses upon discovery.

12. The apparatus as in claim 11, wherein the process when executed is further configured to:

release the pool of temporary IP addresses after the links of the Layer 2 topology have been converted into Layer 3 link.

13. The apparatus as in claim 9, wherein the apparatus converts the one or more interfaces of the given networking device into Layer 3 links by:

moving the networking device at the top of the queue from the queue to a stack, to delay conversion of the one or more interfaces of the networking device into Layer 3 links, when the networking device has at least one unvisited neighbors during the traversal of the graph of the Layer 2 topology or conversion of the one or more interfaces of the networking device into Layer 3 interfaces would disrupt connectivity among the set of networking devices.

14. The apparatus as in claim 9, wherein the apparatus designates one or more interfaces of a discovered networking device as discovery interfaces by:

sending a configuration file to the discovered networking device.

15. The apparatus as in claim 9, wherein the apparatus is part of a cloud-based service.

16. The apparatus as in claim 9, wherein the process when executed is further configured to:

designate one of the networking devices as a peer device of the seed device, wherein the peer device acts as a boundary for the discovery of the Layer 2 topology.

17. A tangible, non-transitory, computer-readable medium storing program instructions that cause a supervisory service to execute a process comprising:

designating, by the service, a particular networking device among a set of networking devices as a seed device and one or more interfaces of the seed device as discovery interfaces;

coordinating, by the service and starting from the one or more discovery interfaces of the seed device, discovery of a Layer 2 topology of the set of networking devices, by designating one or more interfaces of a discovered networking device as discovery interfaces; and converting, by the service and starting from at least one of the network devices farthest from the seed device in the Layer 2 topology and ending with the seed device, links of the Layer 2 topology into Layer 3 links, to form an underlay network, wherein the apparatus converts the links of the Layer 2 topology into Layer 3 links by:

traversing a graph of the Layer 2 topology, starting from the seed device, to populate a queue of networking devices visited during the traversal, and for a networking device at the top of the queue, converting one or more interfaces of a given networking device into Layer 3 links, when the networking device has no unvisited neighbors during the traversal of the graph of the Layer 2 topology and conversion of the one or more interfaces of the networking device into Layer 3 interfaces would not disrupt connectivity among the set of networking devices.

18. The computer-readable medium as in claim 17, wherein the process further comprises:

designating, by the service, one of the networking devices as a peer device of the seed device, wherein the peer device acts as a boundary for the discovery of the Layer 2 topology.

19. The computer-readable medium as in claim 17, wherein converting the one or more interfaces of the given networking device into Layer 3 links further includes:

moving the networking device at the top of the queue from the queue to a stack, to delay conversion of the one or more interfaces of the networking device into Layer 3 links, when the networking device has at least one unvisited neighbors during the traversal of the graph of the Layer 2 topology or conversion of the one or more interfaces of the networking device into Layer 3 interfaces would disrupt connectivity among the set of networking devices.

20. The computer-readable medium as in claim 17, wherein coordinating discovery of the Layer 2 topology of the set of networking devices includes:

broadcasting a message among the set of networking devices that causes an agent on a receiving networking device to send a response to the supervisory device.

* * * * *